United States Patent
Pohl et al.

(10) Patent No.: US 10,839,072 B2
(45) Date of Patent: Nov. 17, 2020

(54) RANSOMWARE RESETTER

(71) Applicant: INTERNATIONAL BUSINESS MACHINES CORPORATION, Armonk, NY (US)

(72) Inventors: Thomas Pohl, Weil im Schoenbuch (DE); Martin Tröster, Renningen (DE); Marco H. Kroll, Berlin (DE); Matthias Seul, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 15/876,284

(22) Filed: Jan. 22, 2018

(65) Prior Publication Data

US 2019/0228148 A1    Jul. 25, 2019

(51) Int. Cl.
| | |
|---|---|
| G06F 21/55 | (2013.01) |
| G06F 11/14 | (2006.01) |
| G06F 3/06 | (2006.01) |
| G06F 16/14 | (2019.01) |
| G06F 21/79 | (2013.01) |

(52) U.S. Cl.
CPC .......... *G06F 21/554* (2013.01); *G06F 3/0619* (2013.01); *G06F 3/0659* (2013.01); *G06F 3/0683* (2013.01); *G06F 11/1451* (2013.01); *G06F 16/152* (2019.01); *G06F 21/79* (2013.01); *G06F 2201/825* (2013.01); *G06F 2221/034* (2013.01)

(58) Field of Classification Search
CPC ............................... G06F 21/554; G06F 21/56
USPC .......................................................... 726/23
See application file for complete search history.

(56) References Cited

U.S. PATENT DOCUMENTS

| | | | |
|---|---|---|---|
| 9,292,687 B2 | 3/2016 | Thure et al. | |
| 9,514,309 B1 | 12/2016 | Mann | |
| 10,121,003 B1* | 11/2018 | Adams | .................. G06F 21/565 |
| 2016/0078243 A1* | 3/2016 | Bruso | .................. H04L 63/102 |
| | | | 726/27 |
| 2017/0091461 A1 | 3/2017 | Tin et al. | |

FOREIGN PATENT DOCUMENTS

WO    2017053745 A1    3/2017

OTHER PUBLICATIONS

Vijay, "Folder Virtualization Concepts in Windows Vista", Created Oct. 12, 2007, Accessed on Dec. 6, 2017, 13 pages.

* cited by examiner

*Primary Examiner* — Dant B Shaifer Harriman
(74) *Attorney, Agent, or Firm* — Teddi E. Maranzano

(57) ABSTRACT

A method and a related system for a protection against unauthorized file encryption in a file system may be provided. The method may comprise providing an anti-ransomware file access unit, determining, by the anti-ransomware file access unit, an entropy value for a portion of a file to be written to the file system, and upon determining that the entropy value is equal or above a threshold value, performing a copy-on-write process to the file to be written, whereby the file is written to a copy-on-write storage area.

17 Claims, 6 Drawing Sheets

RANSOMWARE RESETTER

BACKGROUND

The invention relates generally to a method for data protection, and more specifically, to a method for a protection against unauthorized file encryption of data in a file system.

In modern enterprise computing—on premise or cloud computing—as well as in private computing environments—e.g., personal computers, private servers and/or mobile devices—data security and data accessibility are critical elements in the permanent availability of data. However, external attackers may have an interest for corrupting the files, in which the data have been stored. Besides traditional virus attacks, also attacks via ransomware are still very common in this present age.

Ransomware represents the class of malicious software, also known as malware, that has as the objective preventing a legal owner of the data from accessing the data. The files, documents, storage systems, or even entire computers, are basically held as hostages. The data may be encrypted using an encryption key only known by the attacker. Users may then be forced to pay a ransom in order to regain access to their data. Ransomware differs from other types of malware in that its effects may be directly reversible via a decryption key only known to the attacker. Victims may have very little options other than paying the attacker to reverse the encryption process. Some attackers may even enforce strict deadlines in order to get paid. Some ransomware may also start to delete the encrypted files if certain conditions, such as a payment, are not met. Other conditions may include that the legal owner of the data not shutdown the infected storage or computer system.

Instead of paying the ransom, users may try to restore the files from a backup or a snapshot. However, backups are very seldom continuously generated so that the likelihood that at least a portion of the data in the backup is outdated is relatively high. Private users may not have any backups at all.

Combating ransomware may be difficult for a couple of reasons. Firstly, ransomware is easy to create or obtain and the return on the investment is typically relatively high for the attackers. Secondly, operations performed by such ransomware may be difficult to be distinguished from operations of allowed software. Because the target of ransomware attacks is often the "unsophisticated" user, best practices that may preserve user data, such as regular and consequent backups, are unlikely to have been employed.

SUMMARY

According to one aspect of the present invention, a method for a protection against unauthorized file encryption in a file system may be provided. The method may comprise providing an anti-ransomware file access unit, determining, by the anti-ransomware file access unit, an entropy value for a portion of a file to be written to the file system, and upon determining that the entropy value is equal to or above a threshold value, performing a copy-on-write process to the file to be written, whereby the file is written to a copy-on-write storage area.

According to another aspect of the present invention, a related system for a protection against unauthorized file encryption in a file system may be provided. The system may comprise an anti-ransomware file access unit, and a storage device comprising a copy-on-write storage area, wherein the anti-ransomware file access unit is adapted for determining an entropy value for a portion of a file to be written to the file system, and upon a determination that the entropy value is equal to or above a threshold, performing a copy-on-write process to the file to be written, whereby the file is written to a copy-on-write storage area.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings, wherein like reference numerals represent like parts.

FIG. 1 shows a block diagram of an embodiment of the inventive method for a protection against unauthorized file encryption in a file system.

FIG. 2 shows a flow chart of an embodiment for monitoring an executable file.

FIG. 3 shows an embodiment of a flowchart of a write operation of a file.

FIG. 4 shows an embodiment of a flowchart of a read operation of a file.

FIG. 5 shows a block diagram of an embodiment of the system for protection against unauthorized file encryption in a file system.

FIG. 6 shows an embodiment of a computing system comprising the system of FIG. 5.

DETAILED DESCRIPTION

Figure 1:
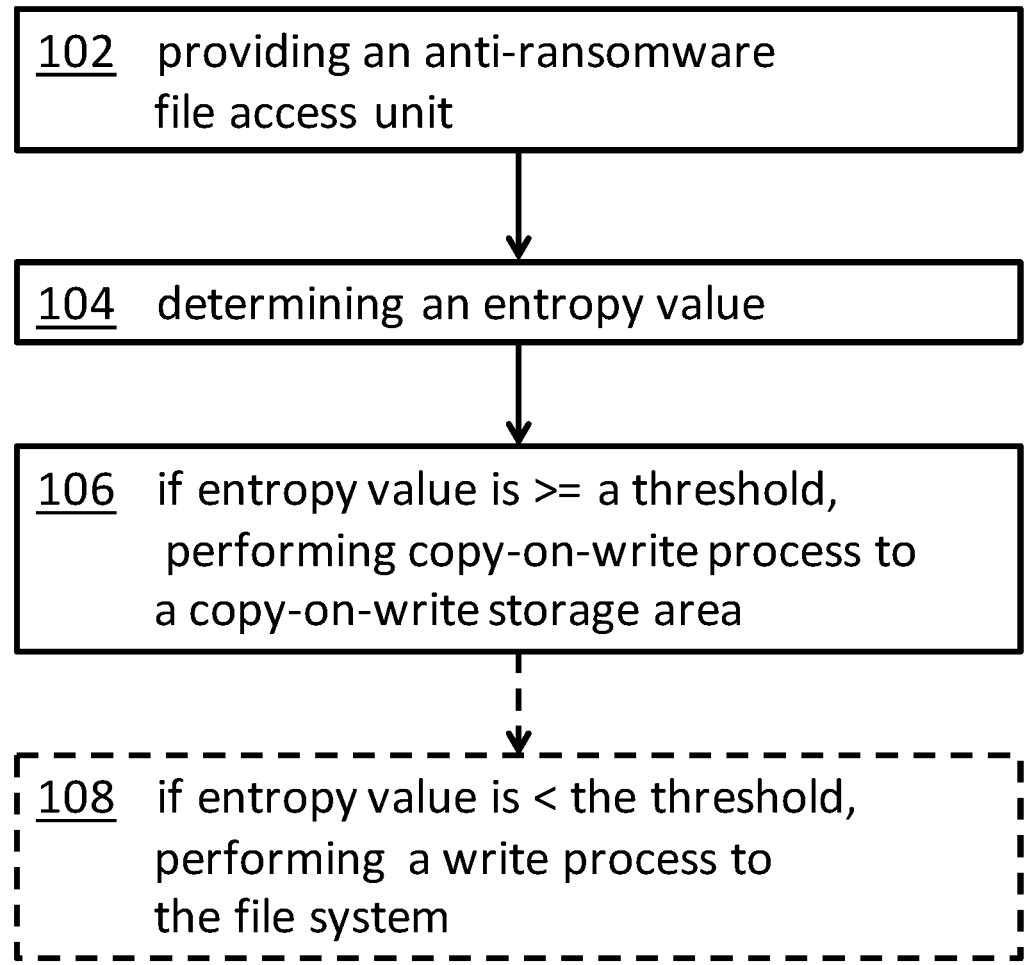

In the context of this description, the following conventions, terms and/or expressions may be used.

The term "encryption" may denote a term from the technical field of cryptography. Encryption may be seen as the process of encoding a message or information in such a way that only authorized parties can access it. Encryption does not itself prevent interference, but denies the intelligible content to a would-be interceptor. In an encryption scheme, the intended information or message, referred to as plaintext, is encrypted using an encryption algorithm—a cipher—generating cipher text that can only be read if decrypted. For technical reasons, an encryption scheme usually uses a pseudo-random encryption key generated by an algorithm. It is in principle possible to decrypt the message without possessing the key, but, for a well-designed encryption scheme, considerable computational resources and skills are required. A non-allowed encryption by an attacker—i.e., ransomware—may make the data unreadable by the natural owner of the data unless the intruder delivers the encryption key in exchange to a ransom.

The term "file system" may denote a technique used to control how data are stored and retrieved. Without a file system, information placed in a storage medium would be one large body of data with no way to tell where one piece of information stops and the next begins. By separating the data into pieces and giving each piece a name, the information is easily isolated and identified. Taking its name from the way paper-based information systems are named, each group of data is called a "file". The structure and logic rules used to manage the groups of information and their names are called a "file system".

The term "ransomware" may denote a type of malicious software from cryptovirology that threatens to publish the victim's data or perpetually block access to it unless a ransom is paid. While some simple ransomware may lock the system in a way which is not difficult for a knowledgeable person to reverse, more advanced malware uses a technique called cryptoviral extortion, in which it encrypts the victim's files, making them inaccessible, and demands a ransom payment to decrypt them. In a properly implemented cryptoviral extortion attack, recovering the files without the decryption key is an intractable problem. Payments in digital currencies make tracing and prosecuting the perpetrators difficult.

The term "anti-ransomware file access unit" may denote a functional unit—implemented in hardware or in software—positioned between a process enabled to read and/or write a file to a file system. The anti-ransomware file access unit may protect an original copy of the file from being encrypted unintentionally by ransomware.

The term "entropy value" may denote a degree of chaos in a file. In computing, entropy can be considered as the randomness collected by an operating system or application for use in cryptography, or other uses that require random data. Randomness may be collected or generated from either software or hardware sources, including specially provided hardware randomness generators, or specialized software programs. A computing of the entropy of a file may relate to a determinable structure of the data within the file. A completely encrypted file may have a comparably high entropy value in contrast to a highly structured file with a lot of redundancies which may have a comparably low entropy value. An ideal encrypted file may be comparable to "white noise", i.e., no structure may be detectable.

The term "copy-on-write" may denote a resource-management technique used in computer programming to efficiently implement a "duplicate" or "copy" operation on modifiable resources. A copy-on-write process may create a copy of an original file that can be modified, instead of modifying the original file and overwriting it.

The term "copy-on-write storage area" may denote a dedicated area on a storage device—also possibly in main memory—only used for files being created by a copy-on-write process. The copy-on-write storage area may be a dedicated part of a file system, an independent file system or may have a completely different storage organization. If a main memory area is used as copy-on-write storage area, the data may be copied later to a persistent storage area.

The term compressed data—resulting from the action of compressing data—may involve encoding the data such that fewer bits are required to store it than was required by the original representation. Lossless compression may reduce the number of bits by identifying and eliminating statistical redundancy in the data. No information is lost in lossless compression. The process of reducing the size of a data file is referred to as data compression.

The proposed method for a protection against unauthorized file encryption in a file system may offer multiple advantages and technical effects.

The proposed method and system can differentiate between a regular and a compromised file, i.e., a file encrypted by ransomware. The mechanism to make this differentiation comprises the determination of the entropy value for a portion or for the complete data file. If a file is encrypted, an additional compression may deliver a different compression value if compared to an unencrypted file. Additionally, the method may also reflect different compression percentages for different types of files. For example, a compression value for an image may be different to a compression value of text records in an address database.

In embodiments of the present invention, if a file modification by a ransomware attack is assumed or identified, the modified file may not overwrite the original file. Thus, the original file may continue to be intact, i.e., continue to be unmodified. Additionally, the related modified file may be written to a special dedicated storage area using a copy-on-write process. Thus, the original file continues to be in existence, even if its content was modified by the ransomware attack. Further investigations and determinations may be made in order to identify a ransomware attack. In case no attack may have happened, the files may easily be copied to the original place in the file system, thereby replacing the unmodified files. Thus, an elegant method and/or system may be provided to fight ransomware attacks.

The proposed method is open to any type of entropy value determination, as well as, for a setting of threshold values which may be used as a decision criteria where to store new or modified files in the copy-on-write storage area.

For the ransomware process, the modification (non-allowed encryption) of the original data seems to be successful and may even be verified on subsequent read operations by the intruder, while for the user and other, unrelated processes, the original data will still be accessible via the standard access methods provided by the operating system.

The proposed solution may ensure business continuity even in case of an in-progress attack, thus preventing costly downtime while systems are being restored. Ensuring the continued operation may bring benefits ranging from the trivial, wherein potential hassle of restoring a backup is avoided, over the business critical, wherein vital information (such as orders or reputation-relevant data) is protected, to the life-critical, wherein heavy, automated machinery in a factory can be kept from endangering workers or medical equipment running to sustain the life of a patient.

Beyond that, the invention ensures a reduced load in the systems as infections can be discovered and rolled-back at their onset, thus reducing the wear-and-tear on the system and overall network by preventing the infection to spread effectively.

Furthermore, the invention avoids additional cost by reducing the need for backup/replacement systems that are used while the original systems are being restored.

In an exemplary scenario, the impact of an in-progress ransomware attack can be almost entirely negated on a business, ensuring continued operation and avoidance of reputation loss.

In the following, additional embodiments of the method, which may also be applicable to the related system, will be described.

According to one embodiment of the method, the threshold may be a predefined threshold value. Using the predefined threshold value, experienced operators may define threshold values for specific environments. In some technical environments or for selected documents or document types various/different threshold values may be selected and predefined in contrast to other documents, document types or technical environments.

According to another embodiment of the method, threshold may be a predefined difference threshold value between the entropy value of an original file and the entropy value of a modified file, wherein the modified file comprises a modifications of the original file, for example as a result of user processing. Thus, the structure of the document or a document type is reflected automatically by building the difference between the entropy value of the original document compared to the entropy value of the modified document.

According to one embodiment, the method may also comprise, upon determining that the entropy value is below the threshold value, performing a write operation of the file in the file system, and thereby modifying the original file. This would represent the normal operation if no ransomware is assumed. The system would behave like in a normal uncompromised system with read and write operations as traditionally known.

According to yet another embodiment, the method may also comprise generating a message if the copy-on-write process is performed. Thus, the method related system may notify a user, an operator—e.g., a security officer—or other system components, e.g., a system management system. This feature may be especially useful in case of a security breach that comprises customer data, when at the same time legal regulations exist that require a notification of governmental or regulatory authorities within a predefined amount of time.

According to an additional embodiment, the method may also comprise copying files from the copy-on-write storage area to the file system. This may be performed on a user or operator request. It may happen after it may have been determined that the related file may have not been infected/encrypted in light of a ransomware attack. This may happen if the threshold value or the threshold difference value may be predefined in a non-appropriate way.

According to a further embodiment of the method, the copy-on-write storage area may be outside of the file system. Thus, the area to which the file may be copied in case of ransomware detection may not be part of the file system. This may represent a higher degree of freedom and data security. Some ransomware attacks may encrypt a complete file system and not only parts thereof. Thus, storing the potentially modified/encrypted file outside of the file system may allow isolating the compromised files in a special storage container.

In another embodiment of the method, the entropy value may be determined by compressing data comprised in the file, or parts of the file, comparing a compression value of the file or parts thereof. It may be noted that encrypted files may have a smaller compressibility than unencrypted files.

The method of this embodiment may also comprise deriving the entropy value from the compression value, e.g., by a formula like $$E=F(\text{compression value}), \text{wherein}$$

E is the entropy value, and

F is a function applied to the compression value. It may be noted that the conversion of the compression value may also be implemented by a lookup table for computing speed reasons.

According to another embodiment, the method may also comprise reading a file by determining whether the file to be read is in the copy-on-write storage area, for example, by searching through the index of the copy-on-write area. The file can be read from the copy-on-write storage area, otherwise, the file can be read from the file system. Thus, the file may be read in any case. This way, it may be determined whether a ransomware attack happened.

According to another embodiment, the method may also comprise providing a separate anti-ransomware file access unit for every process accessing—i.e., reading and/or writing—the file system. In a practical case the file access unit may be implemented in software as another process in order to scale easily with the number or read/write operations.

In the following, a detailed description of the figures will be given. All instructions in the figures are schematic. Firstly, a block diagram of an embodiment of the inventive method for a protection against unauthorized file encryption in a file system is given. Afterwards, further embodiments, as well as embodiments of the system for a protection against unauthorized file encryption in a file system, will be described.

FIG. 1 shows an embodiment of the method 100 for a protection against unauthorized file encryption in a file system. It may be a part of the file system or the complete file system. This differentiation may be selected manually by an operator input or automatically depending on a classification of files or individual directories in the file system. Thus, areas, such as specific directories, may be classified as those where a protection against unauthorized file encryption may be required. Also, an automated recognition of files to be protected against unauthorized file encryption may be possible. The recognition may be based on a file name or a part of it, a file extension or the content of the file.

The method comprises providing, 102, an anti-ransomware file access unit, and determining, 104, by the anti-ransomware file access unit, an entropy value for a portion of a file to be written, either modified files or new ones, to the file system. The file access unit may be implemented as either specialized hardware, or as one or more software modules which may be implemented as part of the operating system. The method 100 may also comprise performing a copy-on-write process to the file to be written if it is determined, 106, that the entropy value is equal or above a threshold value, whereby the file is written to a copy-on-write storage area. Otherwise, writing is being performed to the regular file system. The copy-on-write may be performed to a predefined special area of the file system or outside and separately to the file system.

Optionally and useful in a practical implementation, the method 100 may also comprise the step of performing, 108, a write process to the file system if the entropy value is below the predefined threshold or difference threshold value.

Figure 2:
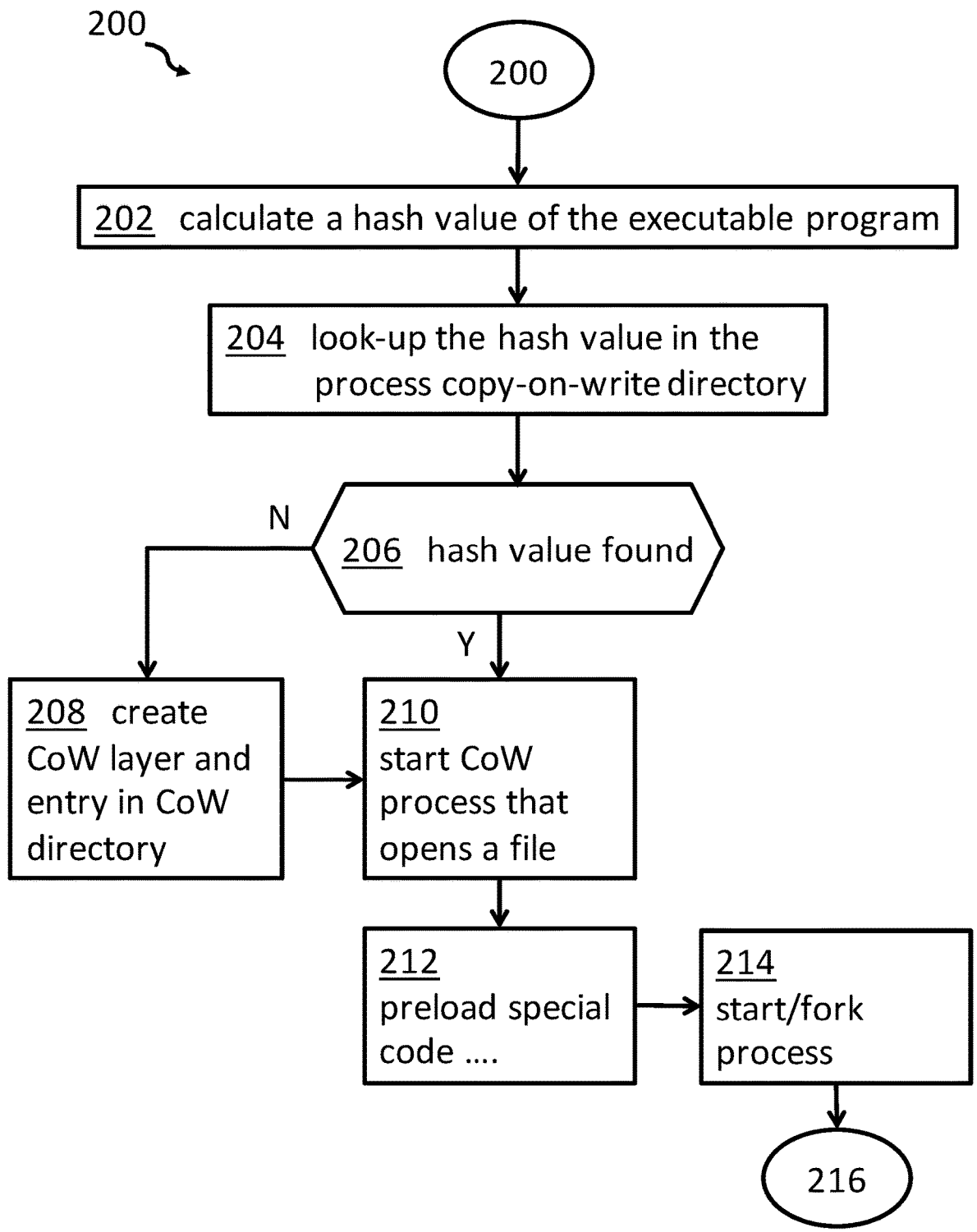

FIG. 2 shows an embodiment of a block diagram 200 for monitoring an executable file. The process starts at 200. Firstly, a hash value for the related executable program is calculated, 202. Then, a look-up of the calculated hash value is performed, 204, in a process copy-on-write directory. The copy-on-write directory may include a process id associated with the executable program, the process, i.e., program name, the calculated hash, and the file system path to the executable path. The copy-on-write directory may be implemented as a directory structure, as in a file system, or any other data storage structure suitable for storing the described data. If the hash value is not found, 206, a new copy-on-write layer is created and an entry for the executable file is made in the copy-on-write directory, 208. In this context, a copy-on-write layer may be implemented as special code comprising executable instructions that are an extension to the operating system kernel. These executable instructions may execute in privileged mode, such that only the operating system process having the highest security permissions is allowed to execute them. The copy-on-write layer intercepts input/output system calls from the executable file. The hash value may not be found, for example, if the executable is not yet monitored for ransomware.

If at 206 the hash value is found, then at 210, a continuous monitoring for ransomware should be made because the executable may be ransomware, or other type of malware. The existing copy-on-write layer is determined via the copy-on-write directory. Then, 212, the special code is preloaded to intercept the traditional file access system instructions and a handle of the started copy-on-write subprocess is returned as a parameter. Then, the process, for which the hash value has been determined, is started/forked, 214. The process ends at 216.

Figure 3:
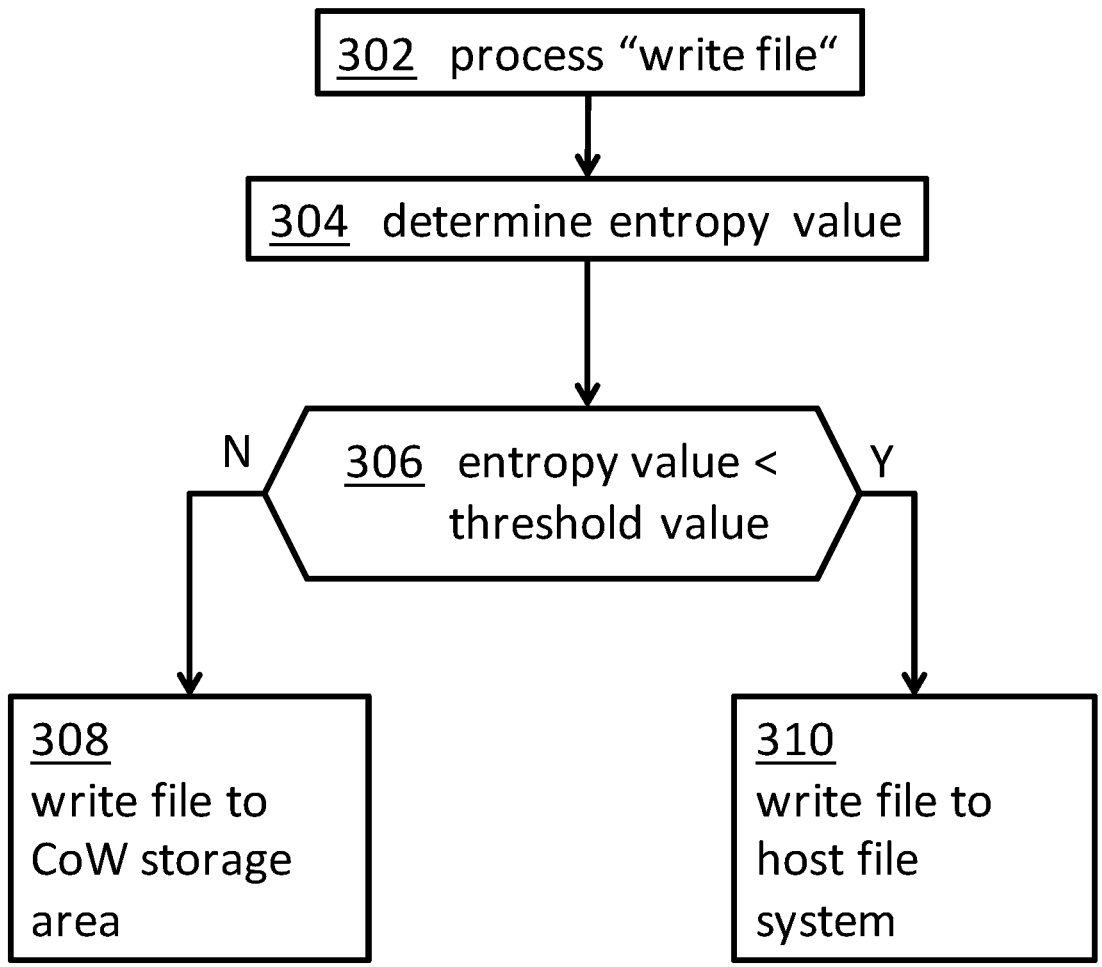

FIG. 3 shows an embodiment of a flowchart 300 of a write operation to a file. A process manipulates data of a file and intends to write to a file, 302. The ransomware file indicator, for example, an entropy value, is determined 304. If the entropy value is determined, 306, to be smaller than a predefined threshold value, then the file is written, 310, to the normal host file system.

In case it is determined, 306, that the entropy value is above or equal to the predetermined threshold value, then the file is written, 308, to the copy-on-write storage area. Thus, the original file in the file system continues to be in existence.

Figure 4:
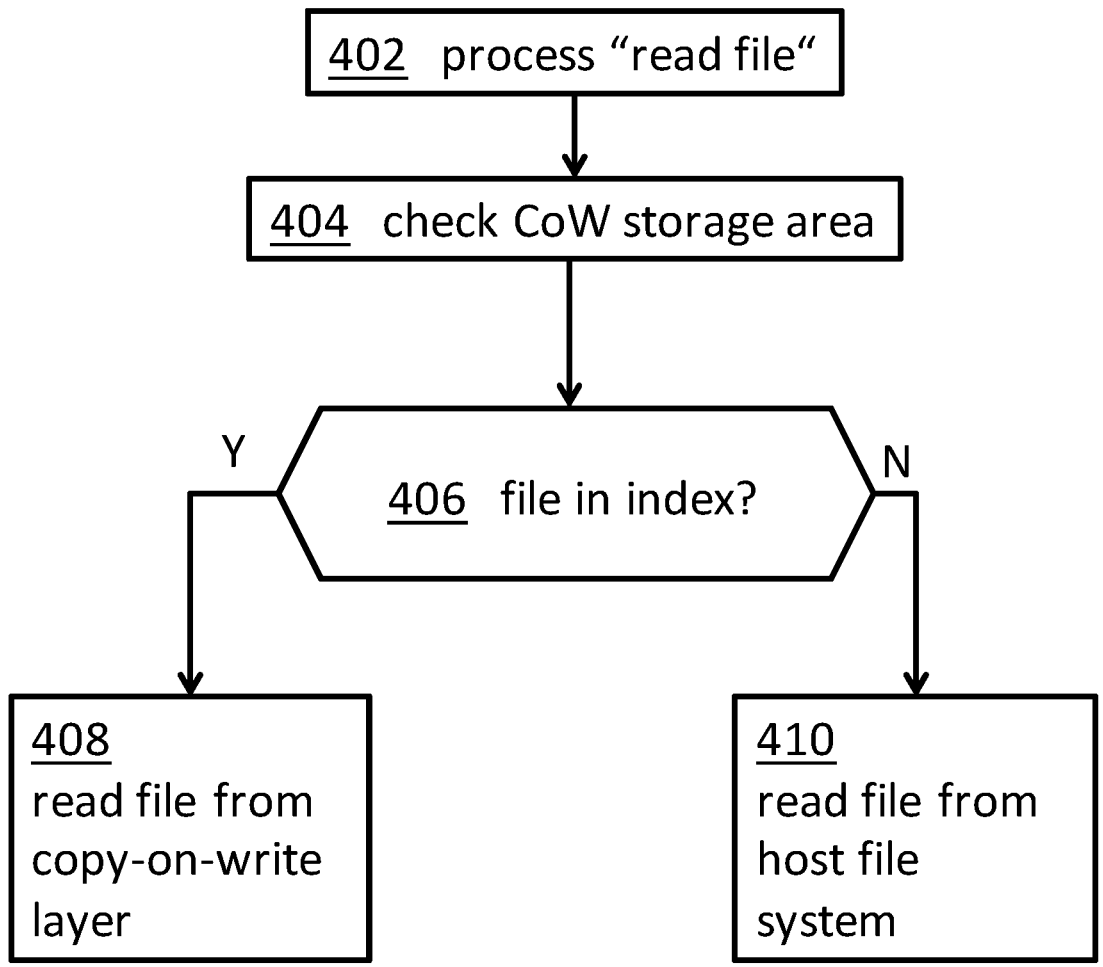

FIG. 4 shows an embodiment of a flowchart 400 of a read operation to a file. It is assumed that in general the monitoring for ransomware is active. The process "read file" is activated, 402. Firstly, it is determined whether an entry exists in an index of the copy-on-write storage area, 404. If it is determined, 406, that such an entry in the index does not exist, then a file handle to the location in the regular host file system is returned, 410.

If, on the other side, an index in the copy-on-write storage area exists, then a mapping exists in the copy-on-write storage area. The file is read, 408, via a file handle returned from the copy-on-write layer from the copy-on-write storage area.

Figure 5:
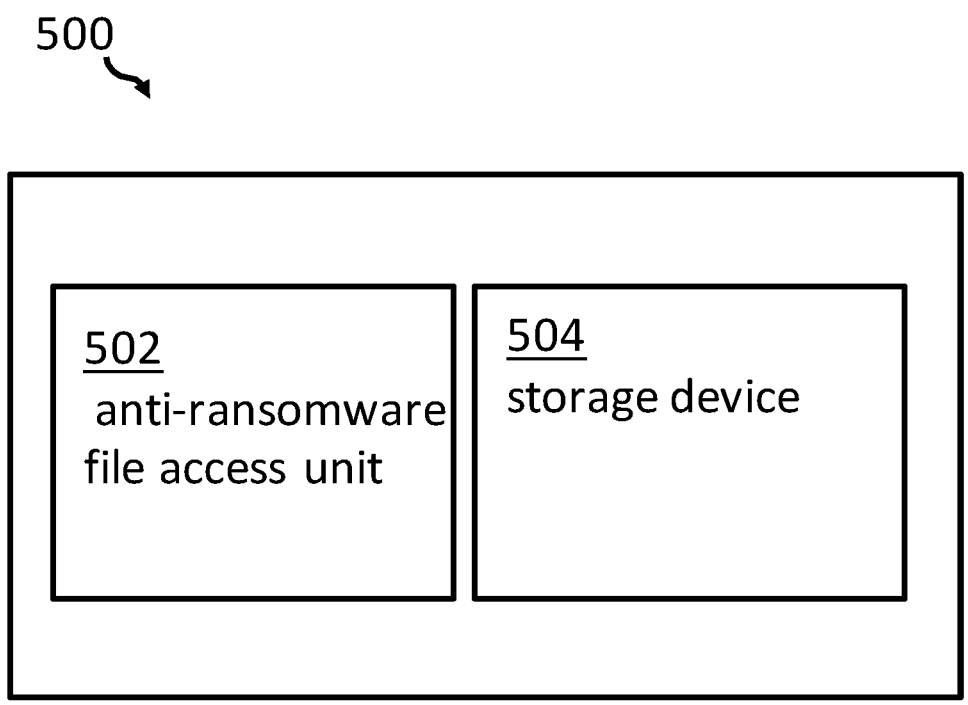
Figure 6:
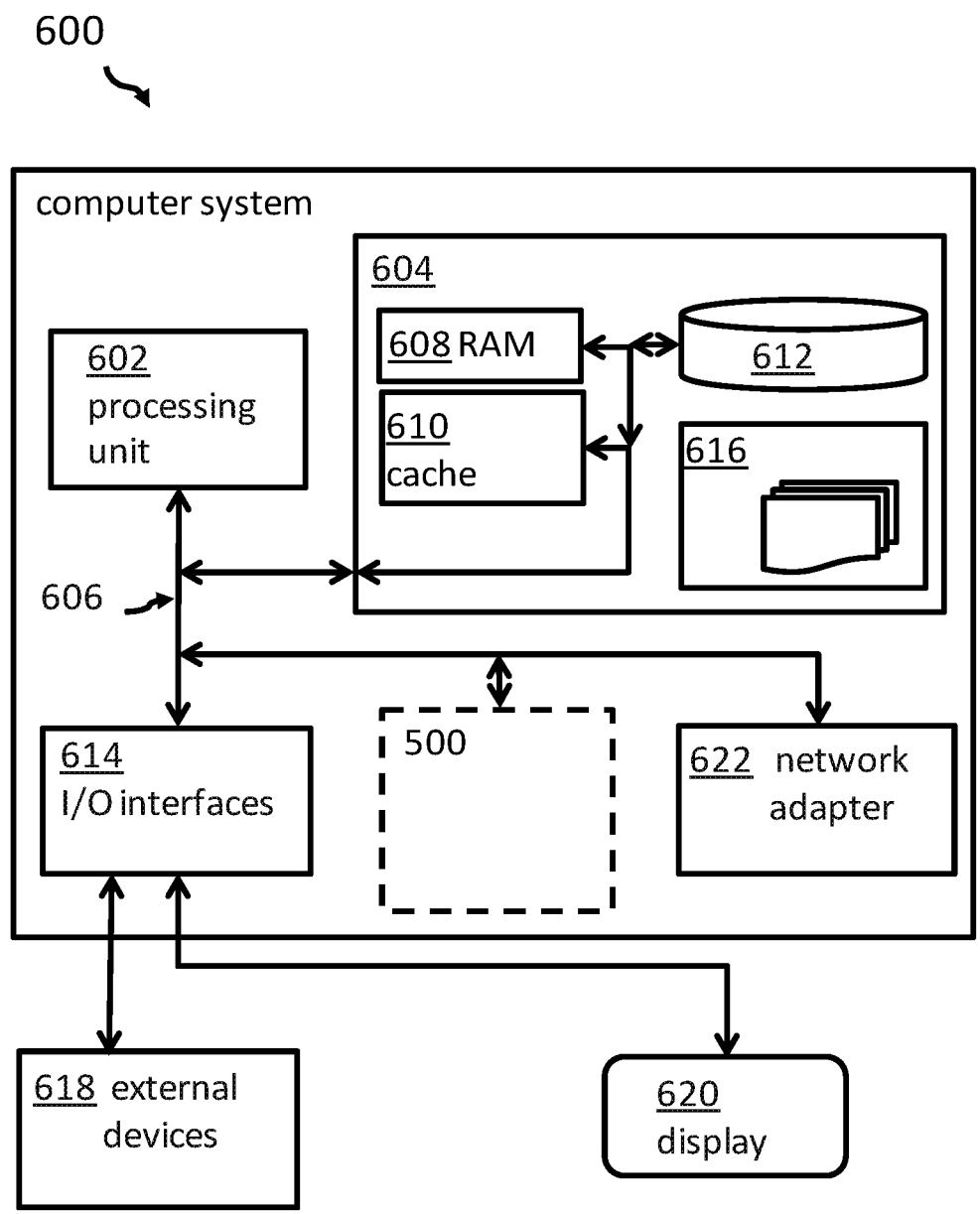

FIG. 5 shows a block diagram of an embodiment of the system 500 for a protection against unauthorized file encryption in a file system. The system 500 comprises an anti-ransomware file access unit 502 and a storage device 504 comprises a copy-on-write storage area. The anti-ransomware file access unit 502 is adapted for determining an entropy value for a portion of a file to be written to the file system. The system 500 may be implemented as a specialized hardware unit, as shown in FIG. 6. Alternatively, the anti-ransomware file access unit 502 may be implemented as computer executable program instructions, such as an extension to the operating system kernel. Furthermore, if the anti-ransomware file access unit 502 is also adapted for writing the file written to a copy-on-write storage area, it is determined that the entropy value is equal or above a threshold value.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media including memory storage devices.

As shown in the figure, the components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the system 500 for a protection against unauthorized file encryption in a file system is attached to the bus system 606. In this embodiment, the system 500 is a hardware implementation.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus", and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another devices to cause a series of operational steps to be performed on the computer, other programmable apparatus or other device to produce a computer implemented process, such that the instructions which execute on the computer, other programmable apparatus, or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for a protection against unauthorized file encryption in a file system, comprising:
   continuously monitoring operations of an executable file;
   in response to detecting a process id associated with an executable file, calculating a hash value of the executable file;
   searching a copy-on-write directory for an entry including the calculated hash value;
   based on locating a corresponding entry in the copy-on-write directory, intercepting input and output system calls from the executable file;
   based on an operation being a request to write a file, determining an entropy value for a portion of the file to be written;
   upon determining that the entropy value is equal to or a above a threshold value,
   performing a copy-on-write process to the file to be written, wherein a copy-on-write entry is created in the copy-on-write directory for the executable file not having a corresponding entry, and wherein the copy-on-write entry includes the process id associated with the executable file, a program name, the calculated hash, and a file system path to the executable file, otherwise writing the file to a host file system; and
   based on the operation being a request to read the file, returning to the operation a file handle from either a copy-on-write storage area or from the host file system, depending on a location of the file.

2. The method according to claim 1, wherein the threshold is a predefined threshold value.

3. The method according to claim 1, further comprising:
   upon determining that the entropy value is below the threshold value, performing a write operation of the file in the file system, wherein the original file is modified.

4. The method according to claim 1, further comprising:
   copying files from the copy-on-write storage area to the file system.

5. The method according to claim 1, wherein the copy-on-write storage area is outside of, and separate from, the file system.

6. The method according to claim 1, wherein the entropy value is determined by:
   compressing data comprised in the file;
   comparing a compression value of the file or parts thereof; and
   deriving the entropy value from the compression value.

7. The method according to claim 1, further comprising reading a file by: searching an index of the copy-on-write storage area for the entry matching the file, and, based on the match of the file in the index, reading the file from the copy-on-write storage area, otherwise, reading the file from the file system.

8. The method according to claim 1, further comprising:
   providing a separate anti-ransomware file access unit for every process accessing the file system.

9. A system for a protection against unauthorized file encryption in a file system, comprising a memory, one or more processors, one or more tangible computer-readable storage devices, an anti-ransomware file access unit, and a plurality of program instructions stored on at least one of the one or more storage devices for execution by at least one of the one or more processors to perform the method comprising:
   continuously monitoring operations of an executable file;
   in response to detecting a process id associated with an executable file, calculating a hash value of the executable file;
   searching a copy-on-write directory for an entry including the calculated hash value;
   based on locating a corresponding entry in the copy-on-write directory, intercepting input and output system calls from the executable file;
   based on an operation being a request to write a file, determining an entropy value for a portion of the file to be written;
   upon determining that the entropy value is equal to or a above a threshold value,
   performing a copy-on-write process to the file to be written, wherein a copy-on-write entry is created in the copy-on-write directory for the executable file not having a corresponding entry, and wherein the copy-on-write entry includes the process id associated with the executable file, a program name, the calculated hash, and a file system path to the executable file, otherwise writing the file to a host file system; and
   based on the operation being a request to read the file, returning to the operation a file handle from either a copy-on-write storage area or from the host file system, depending on a location of the file.

10. The system according to claim 9, wherein based on determining, that the entropy value is below the threshold value, performing a write operation of the file in the file system, wherein the original file is modified.

11. The system according to claim 9, wherein a message is generated if the copy-on-write process is performed, and wherein the message indicates a security breach.

12. The system according to claim 9, further comprising:
    copying files from the copy-on-write storage area to the file system in response to determining that the files in the copy-on-write storage area is not infected.

13. The system according to claim 9, wherein the copy-on-write storage area is outside of, and separate from, the file system.

14. The system according to claim 9, wherein the anti-ransomware file access unit determines the entropy value by:
    compressing data comprised in the file;
    comparing a compression value of the file or parts thereof; and
    deriving the entropy value from the compression value.

15. The system according to claim 9, further comprising:
    searching an index of the copy-on-write storage area for the entry matching the file, and based on locating the file in the index, reading the file from the copy-on-write storage area, otherwise, reading the file from the file system.

16. The system according to claim 9, further comprising:
    a separate anti-ransomware file access unit for every process accessing the files system.

17. A computer program product for a protection against unauthorized file encryption in a file system, the computer program product comprising a non-transitory computer readable storage device having program instructions embodied therewith, the program instructions being executable by one or more computing systems to cause the one or more computing systems to:
    continuously monitoring operations of an executable file;
    in response to detecting a process id associated with an executable file, calculating a hash value of the executable file;
    searching a copy-on-write directory for an entry including the calculated hash value;
    based on locating a corresponding entry in the copy-on-write directory, intercepting input and output system calls from the executable file;
    based on an operation being a request to write a file, determining an entropy value for a portion of the file to be written;
    upon determining that the entropy value is equal to or a above a threshold value,
    performing a copy-on-write process to the file to be written, wherein a copy-on-write entry is created in the copy-on-write directory for the executable file not having a corresponding entry, and wherein the copy-on-write entry includes the process id associated with the executable file, a program name, the calculated hash, and a file system path to the executable file, otherwise writing the file to a host file system; and
    based on the operation being a request to read the file, returning to the operation a file handle from either a copy-on-write storage area or from the host file system, depending on a location of the file.

* * * * *